(12) United States Patent
Sawada

(10) Patent No.: US 7,317,562 B2
(45) Date of Patent: Jan. 8, 2008

(54) IMAGE READING APPARATUS WITH PLURAL SENSOR IC CHIPS

(75) Inventor: Hideki Sawada, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 934 days.

(21) Appl. No.: 10/406,638

(22) Filed: Apr. 2, 2003

(65) Prior Publication Data

US 2004/0105135 A1 Jun. 3, 2004

(30) Foreign Application Priority Data

Apr. 4, 2002 (JP) ............................. 2002-102599

(51) Int. Cl.
*H04N 1/46* (2006.01)
(52) U.S. Cl. ..................... 358/509; 358/478; 358/4; 358/83; 358/513; 358/51; 358/494; 358/496; 358/474; 358/472; 250/208.1; 359/516; 347/241; 399/144
(58) Field of Classification Search ............... 358/509, 358/478, 483, 513, 514, 494, 496, 474, 472; 250/208.1; 359/516; 382/289; 347/241; 399/144
See application file for complete search history.

(56) References Cited

U.S. PATENT DOCUMENTS 6,448,995 B1 * 9/2002 Fujimoto et al. ........... 347/241
6,952,289 B1 * 10/2005 Fujimoto et al. ........... 358/472

FOREIGN PATENT DOCUMENTS

| JP | 9-37086 | 2/1997 |
| JP | 10-285330 | 10/1998 |
| JP | 10285330 A | * 10/1998 |

* cited by examiner

*Primary Examiner*—Kimberly Williams
*Assistant Examiner*—Michael Burleson
(74) *Attorney, Agent, or Firm*—Hamre, Schumann, Mueller & Larson, P.C.

(57) ABSTRACT

An image reading apparatus includes a plurality of sensor IC chips aligned in a row. Each of the sensor IC chips incorporates a plurality of light receiving elements. The plurality of light receiving elements successively output image signals as serial analog signals corresponding to received amount of light upon receiving light from an object to be read. The number of the sensor IC chips is an integer multiple of three. The sensor IC chips are divided into blocks. The number of the blocks is an integer multiple of three. The image signals are outputted on a block-by-block basis.

4 Claims, 4 Drawing Sheets

IMAGE READING APPARATUS WITH PLURAL SENSOR IC CHIPS

BACKGROUND OF THE INVENTION

1. Field of the Invention

The present invention relates to an image reading apparatus used for reading an image of a document or other desired images.

2. Description of the Related Art

A typical image reading apparatus includes a plurality of sensor IC chips which are arranged in a row and each of which incorporates a plurality of light receiving elements as photoelectric conversion elements. Upon receiving light reflected by a document illuminated by a light source, the plurality of light receiving elements output image signals of a level corresponding to the received amount of light as serial analog signals.

With the image reading apparatus having such a structure, reading of an image for one line by successively driving the plurality of sensor IC chips may take a relatively long time when the number of pixels to be read is relatively large. Particularly, for reading a color image of a document, three kind of light sources respectively emitting red light, blue light and green light are provided, and an image for one line need be read three times by successively driving the three kind of light sources, which takes longer time.

In view of the above, JP-A-10-285330 proposes an image reading apparatus in which a plurality of sensor IC chips aligned in a row are divided into a plurality of blocks so that the sensor IC chips are driven on a block-by-block basis. Specifically, in one embodiment, a single D/A converter common to all the blocks is provided, and conversion of analog image signals from the sensor IC chips into digital image signals is performed with respect to each of the blocks with time differences for storage in a memory (time difference D/A conversion). In another embodiment, D/A converters of a number corresponding to the number of blocks are provided, and conversion of analog image signals from the sensor IC chips into digital signals is performed with respect to all the blocks in parallel with each other for storage in a memory (parallel D/A conversion).

When the time difference D/A conversion is utilized, the time required for signal processing becomes long due to the time difference provided among the blocks. Further, the controlling for providing time difference is complicated. On the other hand, the provision of D/A converters of a number corresponding to the number of blocks increases the cost for the image reading apparatus.

SUMMARY OF THE INVENTION

It is, therefore, an object of the present invention, to provide an image reading apparatus which is capable of realizing an increase in the speed of image reading processing and cost reduction.

According to the present invention, there is provided an image reading apparatus comprising a plurality of sensor IC chips aligned in a row. Each of the sensor IC chips incorporates a plurality of light receiving elements which successively output image signals as analog signals corresponding to received amount of light upon receiving light from an object to be read. The number of the sensor IC chips is an integer multiple of three. The sensor IC chips are divided into blocks. The number of the blocks is an integer multiple of three. The image signals are outputted on a block-by-block basis.

Preferably, each of the sensor IC chips in each of the blocks is driven simultaneously with a corresponding sensor IC chip in each of the other blocks.

Preferably, the image reading apparatus further comprises at least one A/D converter including three channels for input signals, and the image signals outputted from the plurality of sensor IC chips on the block-by-block basis are inputted to the A/D converter.

Preferably, the image reading apparatus further comprises a plurality of light sources each emitting light of a different color. In this case, it is preferable that the plurality of light sources and the row of the sensor IC chips are mounted on a common substrate.

According to the present invention, the following advantages are obtained.

Firstly, in converting analog image signals into digital signals using an A/D converter, a so-called three-channel A/D converter which is inexpensive can be effectively utilized, which reduces the cost for the entire image reading apparatus. Specifically, among various A/D converters used in the technical field of image processing, A/D converters of so-called single-channel type and three-channel type are most popular and mass-produced, and hence considerably inexpensive as compared with other types of converters. Generally, the single-channel converter is utilized for processing monochromatic image signals, whereas the three-channel converter is utilized for processing color image signals. In the present invention, the number of image signals simultaneously outputted from the plurality of sensor IC chips is set to be an integer multiple of three, whether the image to be read is a monochromatic image or a color image. Therefore, when the three-channel A/D converter is used, no channel of the converter is wasted, which realizes A/D conversion at high speed utilizing an inexpensive component.

Secondly, in the present invention, the total number of the sensor IC chips is set to be an integer multiple of three. Therefore, when the IC chips are divided into blocks the number of which is an integer multiple of three, the number of IC chips in each block is equalized. Therefore, the image signals respectively outputted from the blocks become equal in length or data amount, so that the plurality of image signals can be processed easily by a common method. If the blocks differ from each other in number of the sensor IC chips, the processing of an image signal outputted from the block incorporating the largest number of sensor IC chips takes the longest time, which hinders an increase in the image reading processing. However, the present invention can avoid such a problem.

Other objects, features and advantages of the present invention will become clearer from the description of the preferred embodiment given below.

DETAILED DESCRIPTION OF THE PREFERRED EMBODIMENTS

Preferred embodiments of the present invention will be described below in detail with reference to FIGS. 1-4.

Figure 1:
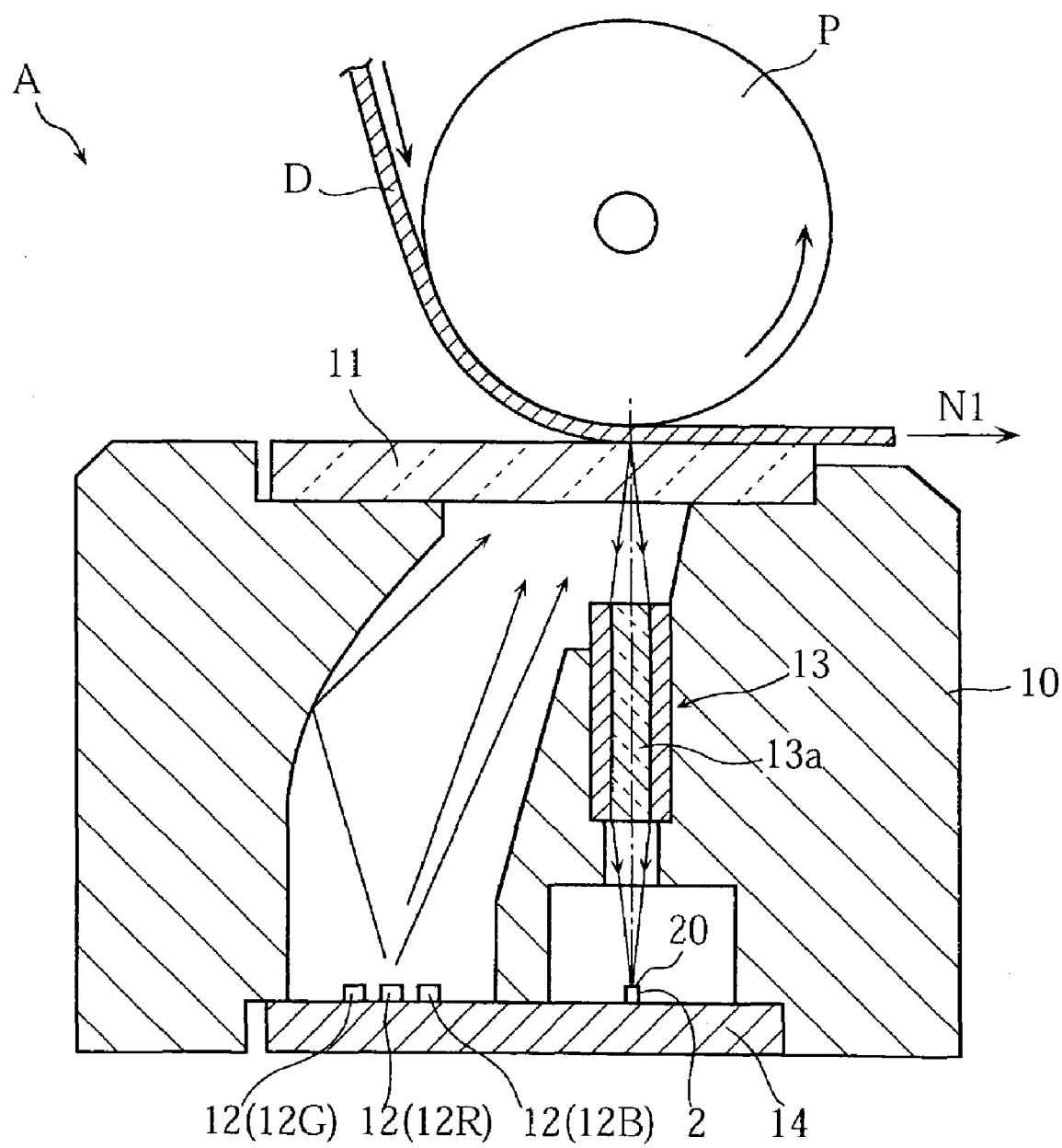
FIG. 1 is a sectional view illustrating an image reading apparatus according to an embodiment of the present invention.

As clearly shown in FIG. 1, an image reading apparatus A according to the illustrated embodiment mainly comprises a case 10, a transparent plate 11, three kinds of light sources 12 (12R, 12G, 12B), a lens array 13 and a plurality of sensor IC chips 2.

The transparent plate 11, which is formed of glass or synthetic resin, serves as a document guide when a platen roller P transfers a document D in the secondary scanning direction indicated by the arrow N1. The three kinds of light sources 12R, 12G and 12B, which are LED light sources respectively emitting red light, green light and blue light, are mounted on an obverse surface of a substrate 14 as arranged at a predetermined pitch in respective rows extending in the primary scanning direction (which corresponds to the rotation axis direction of the platen roller P). The substrate 14 is mounted to the bottom surface of the case 10. Light emitted from each of the light sources 12 passes from below to above the transparent plate 11 to irradiate the obverse surface of the document D. The lens array 13 comprises a plurality of image-forming lenses 13a arranged at a predetermined pitch in a row extending in the primary scanning direction. The light reflected at the obverse surface of the document D passes through each lens 13a for conversion and then received by light receiving elements 20 of each sensor IC chip 2, which will be described later.

Each of the sensor IC chips 2 is a rectangular chip incorporating a plurality of light receiving elements 20 arranged at regular intervals in a row. As clearly shown in FIG. 2, the plurality of sensor IC chip 2 are mounted on the obverse surface of the substrate 14 as aligned in the direction of the row of the light receiving elements 20. The image reading apparatus A of this embodiment has a size applicable to A4-size documents. Each of the sensor IC chip 2 has a resolution of 1,200 dpi (47.2 dots/mm) and incorporates 1,728 light receiving elements 20. The total number of the sensor IC chips 2 is six. Therefore, in the image reading apparatus A, 10,368 light receiving elements 20 in total are arranged at regular intervals in a row.

Figure 3:
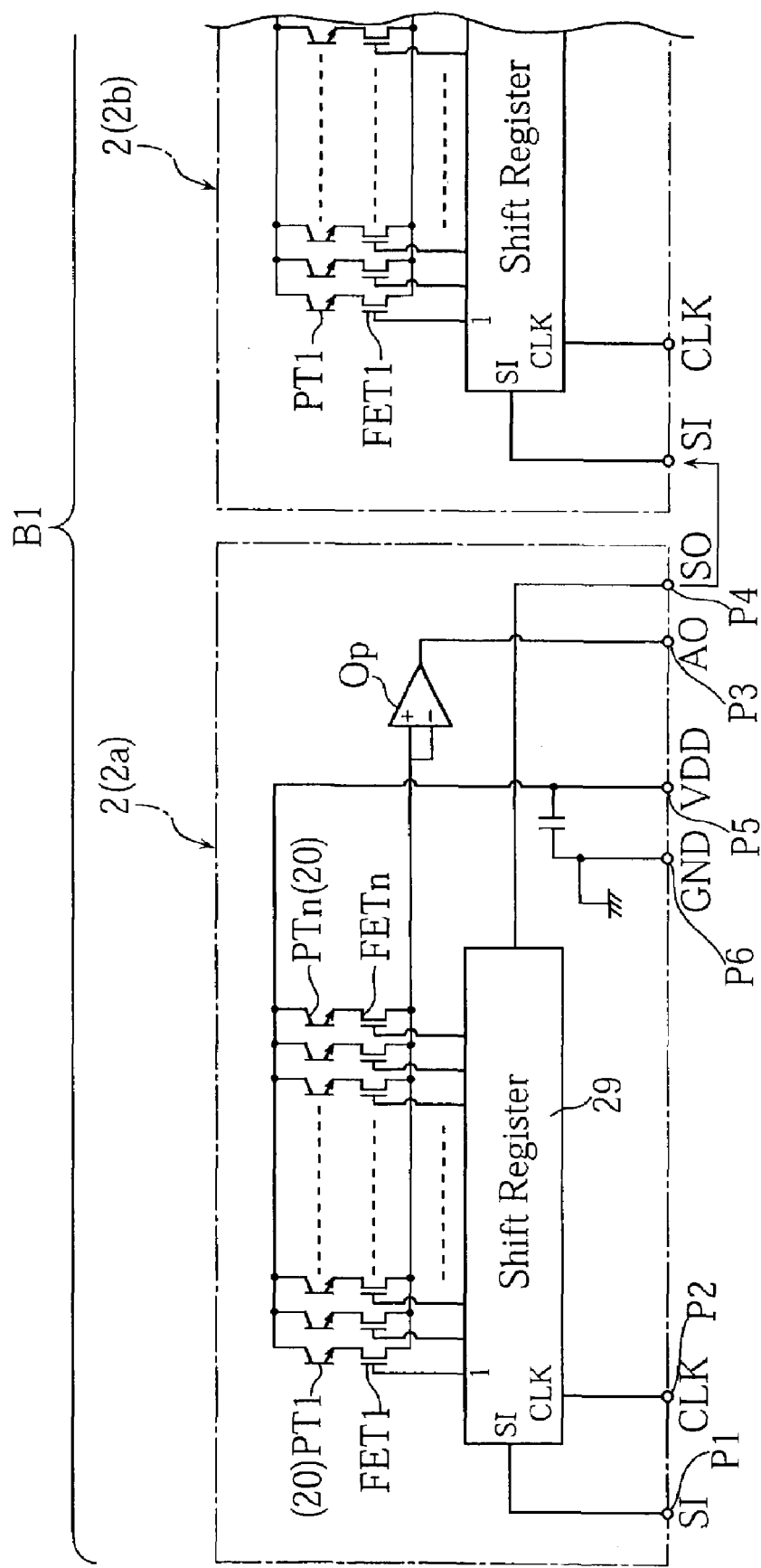
FIG. 3 illustrates an example of circuit arrangement of the sensor IC chips.

As shown in FIG. 3, each sensor IC chip 2 includes a predetermined number (1,728) of phototransistors PT1-PTn constituting the light receiving elements 20. Upon receiving light, the phototransistors PT1-PTn store electric charge corresponding to the received amount of light. The basic circuit arrangement of the sensor IC chip 2 is similar to that of the prior art chip. Specifically, when serial-in signals SI outputted from a control circuit (See FIG. 4) which will be described later are inputted to a pad P1, a shift register 29 successively turns on a plurality of FETs, or FET1-FETn based on clock signals CLK inputted to a pad P2. As a result, the electric charge stored in the plurality of phototransistors PT1-PTn is released successively and amplified at an amplifier OP for serial output through a pad P3 as images signals AO. The image signals AO are analog signals. The sensor IC chip 2 further includes a pad P4 for outputting a serial-out signal SO when an image signal is outputted from the last phototransistor PTn. The sensor IC chip 2 further includes a voltage application pad P5 for supplying driving power required for operating each element in the sensor IC chip 2, and a pad P6 for ground connection.

Figure 2:
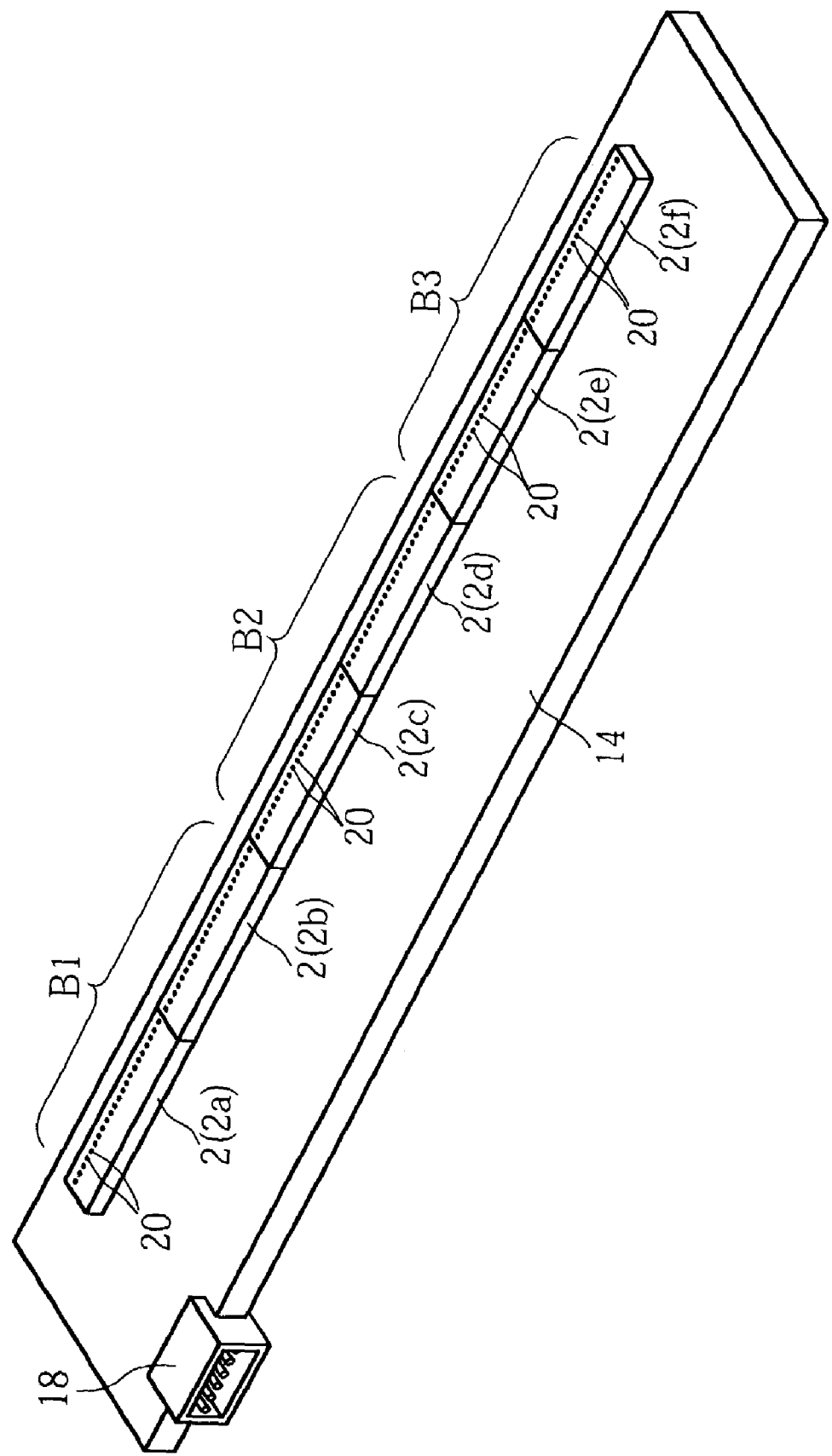
FIG. 2 is a schematic perspective view illustrating a substrate of the image reading apparatus shown in FIG. 1, on which sensor IC chips are mounted.
Figure 4:
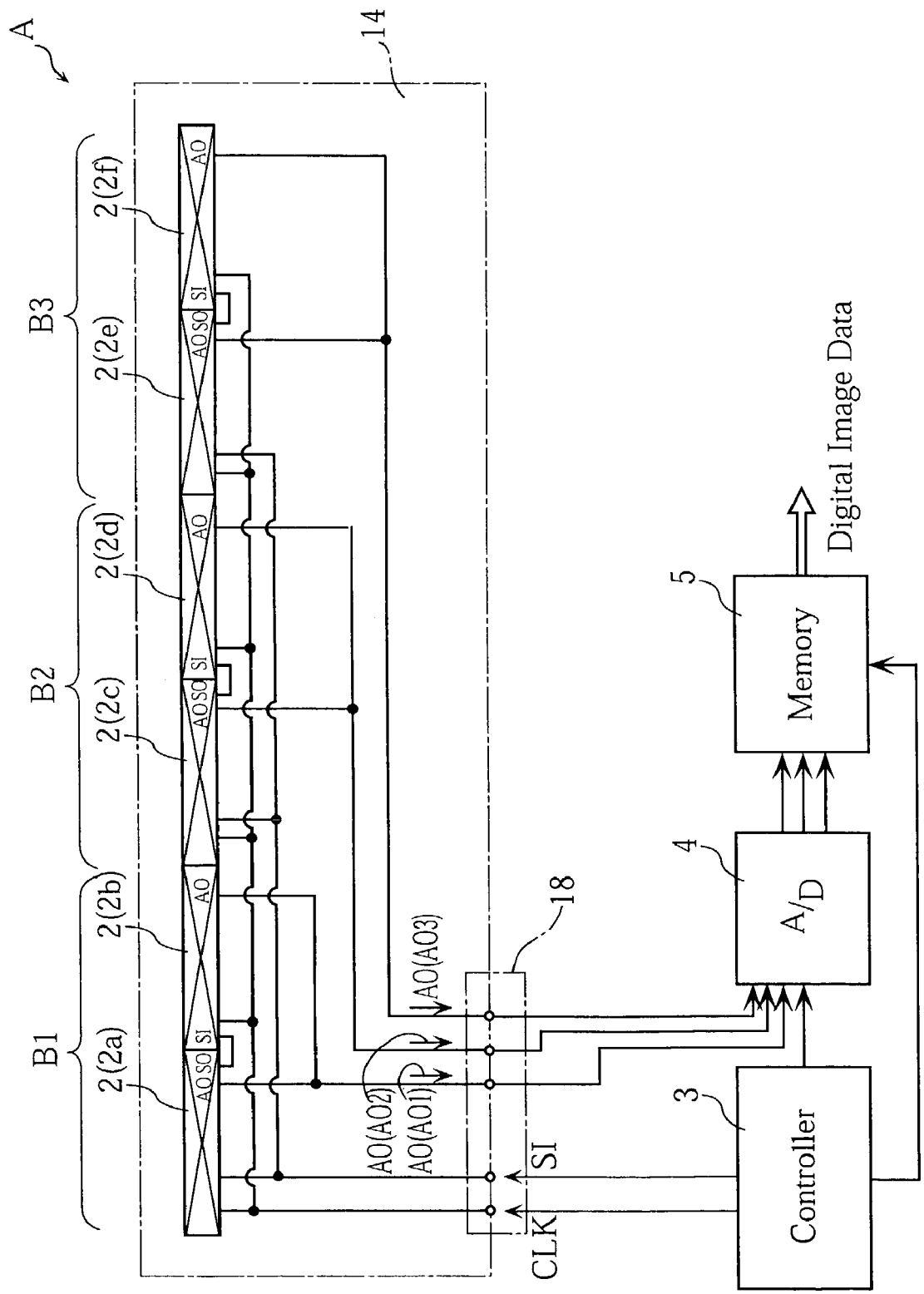
FIG. 4 is a block diagram illustrating the operation of the image reading apparatus.

As clearly shown in FIGS. 2 and 4, the six sensor IC chips 2 (2a-2f) are divided into three blocks B1-B3 each consisting of two adjacent sensor IC chips 2. The obverse surface of the substrate 14 is formed with wiring patterns as shown in FIG. 4. Each wiring pattern has one end connected to a connector 18 provided at one of longitudinal edges of the substrate 14. Power supply from the outside of the substrate 14 to the sensor IC chips 2 and transmission of various signals to and from the sensor IC chips are performed through a cable (not shown) connected to the connector 18.

The image reading apparatus A includes a control circuit 3, an A/D converter 4, a memory 5 and so on as parts connected to the connector 18 of the substrate 14. The control circuit 3 transmits the serial-in signals SI and the clock signals CLK to the connector 18. The serial-in signals SI are divisionally inputted into three sensor IC chips 2 (2a, 2c, 3e) each of which is located on the left in the relevant block B1-B3. For example, as shown in FIG. 3, the driving of the right sensor IC chip 2 (2b) of the block B1 starts when a serial-out signal SO outputted from the pad P4 of the left sensor IC chip 2 (2a) is inputted to a pad P1 of the right IC chip as a serial-in signal S1. The sensor IC chips 2 of the blocks B2 and B3 shown in FIG. 4 operate similarly. Thus, in every block B1-B3, the driving of the right IC chip 2 (2b, 2d, 2f) starts after the driving of the left IC chip 2 (2a, 2c, 2e) is finished. The clock signals CLK transmitted from the control circuit 3 to the connector 18 are divisionally inputted to each of the six sensor IC chips 2 at the same time.

The A/D converter 4 is of a so-called three-channel type capable of converting three analog signals to digital signals at the same time. Three image signals AO (AO1-AO3) outputted serially from the sensor IC chips 2 of the blocks B1-B3 are inputted to the A/D converter 4. The memory 5, which may comprise a RAM for example, serves to store signal data digitized by the A/D converter 4 as addressed. The control circuit 3 controls reading of data from the memory 5. Specifically, by the operation of the control circuit 3, digitized image signals for one line are outputted from the memory 5 in a predetermined order. For example, the order of image signals may be the same as that in the case where the six sensor IC chips 2a-2f are individually driven in succession.

Next, the advantages of the image reading apparatus A having the above-described structure will be described.

As described with reference to FIG. 4, in the image reading apparatus A, three sensor IC chips 2a, 2c, 2e are driven at the same time, followed by simultaneous driving of the other three sensor IC chips 2b, 2d, 2f. Therefore, the image reading process can be performed at a speed which is three times higher than where six sensor IC chips 2 are separately driven in succession without division into blocks.

Three image signals AO1-AO3 are outputted from selected ones of the six sensor IC chips 2 at the same time and converted into digital signals at the three-channel A/D converter 4. Therefore, no channel of the A/D converter 4 remains unused, which realizes efficient A/D conversion. As described before, a three-channel A/D converter as well as a single-channel A/D converter is more popular than an A/D converter with a different number of channels, and therefore is available at a low cost due to mass-production. Thus, the total cost for the image reading apparatus A can be reduced correspondingly.

Further, the image reading apparatus A includes six sensor IC chips 2 in total so that, when the IC chips are divided into three blocks B1-B3, every block B1-B3 consists of two sensor IC chips 2. Therefore, the image signals AO1-AO3 respectively outputted from the blocks B1-B3 are equal in data length so that the signals can be processed by the same method. Accordingly, the process can be performed easily, which increases the processing speed.

The present invention is not limited to the above-described embodiment. The specific structure of each component of the image reading apparatus according to the present invention may be modified in various ways.

In the present invention, the number of blocks into which the plurality of sensor IC chips are divided is not limited to three. The number of blocks may be six, nine, twelve or any other integer multiple of three. Even when the division into such a number of blocks is employed, the image signals outputted from the blocks can be efficiently converted into digital signals by the three-channel A/D converter without wasting any channel. In the case where the number of blocks and the output number of image signals is six or other integer multiple of three larger than six, all of the image signals may be processed at the same time using a plurality of three-channel A/D converters.

Similarly, the number of sensor IC chips is not limited to six and may be another integer multiple of three, as opposed to the above-described embodiment. In the case where the number of sensor IC chips is an integer multiple of three (other than six), the sensor IC chips can be divided into blocks the number of which is an integer multiple of three so that the blocks become equal in number to the sensor IC chips.

Table 1 below shows the specifications of sensor IC chips in the case where the image reading apparatus of the present invention is adapted for reading A4-size documents.

As will be understood from Table 1, in the present invention, the number of light receiving elements included in each chip, the number of chips, the output number of image signals and so on may be modified in various ways depending on the resolution or the like. Of course, the image reading apparatus according to the present invention may be adapted for reading documents of a size other than A4. The apparatus can be adapted for reading A6-size documents when the number of light receiving elements in each chip and the total number of light receiving elements are made half the values given in Table 1.

Since the present invention can increase the reading process speed, it is most suitable for reading color images. However, the present invention is not limited thereto and may also be applicable to reading monochromatic images.

The image reading apparatus according to the present invention need not necessarily incorporate the A/D converter. Alternatively, the A/D converter may be used as arranged externally of the image reading apparatus. Even when the A/D converter is arranged externally, the use of the three-channel A/D converter makes it possible to attain the object of the present invention.

TABLE 1

| Resolution | Number of Light Receiving Elements per Chip | Number of Chips | Total Number of Light Receiving Elements | Image Signal Output Number (Number of Blocks) |
|---|---|---|---|---|
| 200 dpi (7.9 dots/mm) | 576 | 3 | 1,728 | 3 |
| | 288 | 6 | | 3 |
| | 192 | 9 | | 3 |
| | 144 | 12 | | 3 or 6 |

TABLE 1-continued

| Resolution | Number of Light Receiving Elements per Chip | Number of Chips | Total Number of Light Receiving Elements | Image Signal Output Number (Number of Blocks) |
|---|---|---|---|---|
| 300 dpi (11.8 dots/mm) | 864 | 3 | 2,592 | 3 |
| | 432 | 6 | | 3 |
| | 288 | 9 | | 3 |
| | 216 | 12 | | 3 or 6 |
| 600 dpi (23.6 dots/mm) | 1,728 | 3 | 5,184 | 3 |
| | 864 | 6 | | 3 |
| | 576 | 9 | | 3 |
| | 432 | 12 | | 3 or 6 |
| 1200 dpi (47.2 dots/mm) | 3,456 | 3 | 10,368 | 3 |
| | 1,728 | 6 | | 3 |
| | 1,152 | 9 | | 3 |
| | 864 | 12 | | 3 or 6 |
| 2400 dpi (94.5 dots/mm) | 6,912 | 3 | 20,736 | 3 |
| | 3,456 | 6 | | 3 |
| | 2,304 | 9 | | 3 |
| | 1,728 | 12 | | 3 or 6 |

The invention claimed is:

1. An image reading apparatus comprising a plurality of sensor IC chips aligned in a row, and at least one A/D converter including three channels for input signals, each of the sensor IC chips incorporating a plurality of light receiving elements, the plurality of light receiving elements successively outputting image signals as analog signals corresponding to received amount of light upon receiving light from an object to be read;

the number of the sensor IC chips being an integer multiple of three;

the sensor IC chips being divided into blocks, the number of the blocks being an integer multiple of three, the image signals being outputted on a block-by-block basis;

wherein the three channels of said at least one A/D converter receiving the image signals from the sensor IC chips in three blocks at the same time for conversion to digital signals.

2. The image reading apparatus according to claim 1, wherein each of the sensor IC chips in each of the blocks is driven simultaneously with a corresponding sensor IC chip in each of the other blocks.

3. The image reading apparatus according to claim 1, further comprising a plurality of light sources each emitting light of a different color.

4. The image reading apparatus according to claim 3, wherein the plurality of light sources and the row of the sensor IC chips are mounted on a common substrate.

* * * * *